United States Patent [19]

Appelbaum et al.

[11] Patent Number: 5,758,188

[45] Date of Patent: May 26, 1998

[54] SYNCHRONOUS DMA BURST TRANSFER PROTOCOL HAVING THE PERIPHERAL DEVICE TOGGLE THE STROBE SIGNAL SUCH THAT DATA IS LATCHED USING BOTH EDGES OF THE STROBE SIGNAL

[75] Inventors: Jeffrey Herbert Appelbaum, San Mateo; John Welsford Brooks, San Jose; James P. McGrath, Mountain View; Hung C. Nguyen, San Jose, all of Calif.

[73] Assignee: Quantum Corporation, Milpitas, Calif.

[21] Appl. No.: 555,977

[22] Filed: Nov. 21, 1995

[51] Int. Cl.$^6$ ..................................................... G06F 13/00
[52] U.S. Cl. ..................... 395/855; 395/285; 395/821; 395/825; 395/881; 375/354; 375/359; 375/377
[58] Field of Search .................. 365/189.05; 375/377, 375/354, 359; 395/285, 375, 412, 831, 848, 821, 825, 855, 881

[56] References Cited

U.S. PATENT DOCUMENTS

| | | | |
|---|---|---|---|
| 4,701,841 | 10/1987 | Goodrich et al. | 395/306 |
| 4,758,992 | 7/1988 | Taguchi | 365/222 |
| 4,937,734 | 6/1990 | Bechtolsheim | 395/412 |
| 4,941,157 | 7/1990 | Taylor | 375/377 |
| 4,954,983 | 9/1990 | Klingman | 395/831 |
| 5,125,084 | 6/1992 | Begun et al. | 395/375 |
| 5,280,623 | 1/1994 | Sodos et al. | 395/285 |
| 5,384,735 | 1/1995 | Park et al. | 365/189.05 |
| 5,561,821 | 10/1996 | Gephardt et al. | 395/848 |

OTHER PUBLICATIONS

Stephen Finch, Ed.; "AT Attachment Interface with Extensions;" Jan. 10, 1994; Tustin, CA.

Primary Examiner—Christopher B. Shin
Assistant Examiner—Po C. Huang
Attorney, Agent, or Firm—David B. Harrison

[57] ABSTRACT

A synchronous DMA burst transfer method is provided for transferring data between a host device and a peripheral drive device connected by an ATA bus. The method provides synchronous data transfer capability in an asynchronous system by having one device in charge of both a strobe signal and a data signal. When a host read or write command is delivered to the peripheral drive device, the peripheral device decides when to start the synchronous DMA burst. For a read command, the peripheral device requests the synchronous DMA burst then drives a data word onto the ATA bus after the host acknowledges that it is ready to begin the burst. After allowing time for the data signal to settle, the peripheral device toggles a strobe signal from a high state to a low state. The host sees the edge of the strobe signal at which time the host latches the data word on the bus. Additional data words can be driven on the bus and the strobe signal can be retoggled to latch the additional data words into the host. After all data words have been transferred, the strobe signal is returned to a high state so that it is ready to be used for another host command. By having the device which is sending the data in charge of both the strobe signal and the data signal, the method reduces timing delays and provides a data transfer rate up to 33 MBytes/sec. The method is easily implemented in existing systems and is backward compatible with existing transfer protocols.

22 Claims, 8 Drawing Sheets

5,758,188

SYNCHRONOUS DMA BURST TRANSFER PROTOCOL HAVING THE PERIPHERAL DEVICE TOGGLE THE STROBE SIGNAL SUCH THAT DATA IS LATCHED USING BOTH EDGES OF THE STROBE SIGNAL

FIELD OF THE INVENTION

The present invention relates to data transfer between a host device and a peripheral drive device via a bus. More particularly, the invention relates to a method for performing synchronous direct memory access, DMA, data transfers at an increased data rate.

BACKGROUND

Data transfer rates between a host device and peripheral drive devices within a personal computer, PC, system are limited by the bus architecture interconnecting the devices. One type of bus commonly used to interconnect or interface the peripheral drive device to a system bus of a PC is an ATA bus, which is a disk drive interface originally designed for the ISA bus of the IBM PC/AT. The ATA bus was first configured using LS-TTL (Low-power Schottky transistor-transistor logic) gates to drive an 18 inch cable. The slow edges of the LS-TTL gates and the short cable length worked adequately in the then existing systems. However, as PC systems have become faster and more complex, the definition of the ATA bus has been expanded to include operating modes performing faster data transfer rates, and hardware designers have often extended the ATA cable length to well over 18 inches. For example, PIO (programmed I/O) modes now include PIO modes 0–4. Modes 0, 1 and 2 correspond to the ATA interface as originally defined, while PIO Mode 3 defines a maximum data transfer rate of 11.1 MBytes/sec and PIO Mode 4 defines a maximum transfer rate of 16.7 MBytes/sec. Similarly, new DMA modes have been defined. Multiword DMA Mode 0 corresponds to the original interface, while DMA Modes 1 and 2 provide faster data transfer rates. Multiword DMA Mode 2 has the same maximum transfer rate as the new PIO Mode 4.

These new operating modes require higher performance from the ATA bus, resulting in an effort to increase data transfer rates by reducing cycle times. The effort to reduce cycle times has been accomplished by increasing edge rates. The increased edge rates together with the increase in ATA cable length have in turn led to the emergence of weaknesses in the original ATA cabling configuration. These weaknesses affect the integrity of the signals transmitted over the cable. Of particular concern are excessive ringing and crosstalk between signals, and timing/propagation delays which can lead to system failure and/or data loss. Increased edge rates and excessive cable length cause these problems. Thus, the data transfer rate of valid usable data is restricted by limitations inherent to the structure of the ATA bus.

The increased edge rates and excessive cable length are problematic to the ATA bus because it is a poorly terminated bus structure design. The standard 18 inch ATA bus cable is generally modeled as a single-ended transmission line with a characteristic impedance typically of about 110 ohms and a propagation velocity typically of about 60% c. According to transmission line theory, ringing occurs when the termination impedance does not match the characteristic impedance of the cable. The amplitude of ringing is increased with a greater mismatch of impedances. Ringing of sufficient amplitude on signal and data lines of the ATA bus can cause false triggering and excessive settling delays which can lead to system failure and/or data loss.

The occurrence of ringing is especially problematic for data transfers over an ATA bus in PC systems because digital information is being transferred over a transmission line. According to another aspect of transmission line theory, information to be transmitted over the transmission line is input as a waveform. Due to the characteristic impedance and length of the transmission line, the waveform output from the transmission line has some distortion. In analog transmissions where the input waveforms are generally sine waves, the output waveform is typically distorted by a phase shift which can be corrected with relative ease. However, in digital transmissions, the input waveforms are generally some type of square wave, since recognition of an edge transistion is what is important due to the fact that information transmitted is in the form of 1's and 0's. Distortion of these square waves is evident as ringing, which results in a waveform in which the edge transistions cannot be clearly recognized. Thus, chances for false triggering, as mentioned above, are likely and symptomatic of digital transmissions.

The problem of increased ringing has become more prevalent recently because the bus architecture of the modern PC has changed to accommodate increased processor and drive speeds. As processor bus speeds have increased from 8 MHz to 33 MHz and disk drives have increased in speed, it has become necessary to update the ATA standard to allow for faster data transfer rates. To reduce propagation delay, some manufacturers have increased the output drive of the host in order to slew the output signal faster with the capacitive load of the cable. This has been accomplished by implementing the ATA interface chips with fast CMOS processes instead of the low speed TTL devices used in the first ATA buses. As a result, the output impedance has decreased, and the edge rates on the ATA bus have decreased to 1 to 2 ns or less, as opposed to a 5 to 6 ns range of the TTL devices. These fast edges without sufficient terminations have aggravated the ringing on the bus to the point that many system/drive combinations fail to work.

Crosstalk occurs when switching on one signal line causes induced signals in an adjacent or nearby line. A signal couples into an adjacent line by two mechanisms: coupling capacitance and mutual inductance. As a switching signal wavefront propagates down a cable, it couples energy into the adjacent line. Once the energy is in the second line, it propagates in both directions: toward the receiver and toward the source. The magnitude of the coupled signal is proportional to the rate of change of the signal in the primary line. Additionally, the amplitude of the coupled signal is proportional to the total amount of coupling capacitance and mutual inductance, and is therefore proportional to cable length. These crosstalk characteristics make it important to control the slew rate and cable length of newer ATA bus drivers because fast edge rates and resulting ringing on the data lines can couple by crosstalk into adjacent control lines, and cable lengths over 18 inches increase the probability of crosstalk.

An additional concern associated with the poor termination and cable length of an ATA bus design is propagation delay which is further aggravated by cable length violations. As discussed above, the ATA bus was originally defined to have a maximum length of 18 inches. However, today, system designers are hard pressed to design a system in which a host device can be connected to a peripheral drive device within 18 inches. Moreover, some systems are being implemented with dual-ATA interface ports for sharing two ATA cables. These ports are not completely independent of each other, and dual-porting results in an ATA cable which is effectively 36 inches long. These increased cable lengths impose propagation delays associated with the host and peripheral drive devices sending control and data signals back and forth to each other. These propagation delays ultimately affect the data transfer rate and overall performance of the bus.

A further concern related to data transfers over the ATA bus is data integrity. It is important that the data transferred over the bus is valid, and thus there is a desire to provide error detection capability which is reliable and which can be easily implemented. Since words made up of data bits are being transferred over the ATA bus, a bit oriented error detection approach is more practical than a symbol oriented error detection approach. However, conventional bit oriented error detection is impractical for data transfers occurring over the ATA bus, because the conventional bit oriented error detection is a bit-serial approach. The conventional bit error detection procedure generates a cyclic redundancy code (CRC) value by logically manipulating a stream of input data bits using a generator polynomial:

$$G(X)=X^{16}+X^{12}+X^5+1.$$

Each bit of the data stream is shifted sequentially into a CRC logic encoder/decoder by a bit clock operating at a bit cell timing rate. Since the data transfers occurring over the ATA bus are transferring 16-bit words of data, each word is transferred at a clock period equal to 16 times the bit clock. Thus, using the existing bit serial approach operated by a bit clock would require clocking at the frequency of the bit clock, or 16 times the word clock. A further problem of the bit-serial approach is that since the data is being transferred in word units, there is no bit clock available at this part of the ATA interface circuit structure. Thus, the existing bit oriented error detection procedure is not a practical method of providing data integrity for data transfers over the ATA bus.

The above discussed limitations of the ATA bus design have restricted the data transfer capability between a host device and a peripheral drive device to the rates as described above. With the emergence of still faster processors and peripheral devices it is desirous to obtain still faster and accurate data transfer rates between the host and peripheral drive devices. Thus, there exists a hitherto unsolved need for an improved, simple and cost effective method for performing data transfers between a host device and a peripheral drive device over a bus interface having certain operational limitations, at an increased data transfer rate without violating the operational limitations of the bus interface.

SUMMARY

The method of the present invention satisfies these needs.

The present invention is directed to a method for performing a synchronous DMA burst in a computer system which includes a host device connected to at least one peripheral drive device by a bus, where the bus has an associated control signal transmission strobe rate and is used for data transfers between the peripheral drive device and the host device in response to a host device read or write command. The data transfers for each command are carried out through a series of the synchronous DMA bursts over the bus.

In response to a host device read command, the peripheral drive device asserts a DMA request signal to initiate the synchronous DMA burst, and when the host device is ready to begin the synchronous DMA burst, the host device asserts a DMA acknowledge signal in response to the DMA request signal. Within a certain predetermined time period after the host device asserts the DMA acknowledge signal, the peripheral drive device places a first data word on the bus, then after a second predetermined time period has elapsed since placing the data word on the bus, the peripheral drive device toggles a strobe signal from a high state to a low state to latch the first data word into the host device. In the method of the present invention, the peripheral drive device is always in control of initiating the synchronous DMA burst, and the device which is sending the data is in control of both the data and the strobe signal which latches the data into the device receiving the data. The control of both the data and the strobe signal by one device minimizes effects of propagation delay, cable settling and setup time associated with the DMA bursts and thus increases a rate at which data can be transferred over the bus.

An additional word can be transferred during the DMA burst by the peripheral drive device placing the additional word on the bus; then, after the second predetermined time period has elapsed, the peripheral drive device toggles the strobe signal from the low state to the high state to latch the additional word into the host device. These steps of placing the additional word on the bus and toggling the strobe signal from one state to the other state can be repeated until the peripheral drive device has finished sending all data words to be transferred. When the peripheral drive device has finished sending all the data, the peripheral drive device deasserts its DMA request signal to terminate the synchronous DMA burst. If the strobe signal is not at the high state after the peripheral drive device has finished sending the data, the peripheral drive device returns the strobe signal back to the high state.

Additionally, the method can include steps to perform parallel bit oriented error detection to ensure that the data transferred during the synchronous DMA burst is valid. During the data transfer, both the peripheral drive device and the host device calculate a 16-bit CRC value. After the peripheral drive device has sent a complete DMA burst, the host device sends its calculated CRC value to the peripheral drive device and the peripheral drive device performs a comparison of the received CRC value with its calculated CRC value to check for any errors.

When the host device command is a write command, the synchronous DMA burst is still initiated by the peripheral drive device asserting a DMA request signal. When the host device is ready to begin the burst, the host device asserts a DMA acknowledge signal and places a first data word on the bus. Responding to the DMA acknowledge signal, the peripheral drive device asserts a ready signal within a predetermined time period after the DMA acknowledge signal is asserted. The host device then toggles the strobe signal from the high state to the low state within the predetermined time period after the ready signal was asserted by the peripheral drive device. The toggling of the strobe signal latches the data word into the peripheral drive device. Additional data words are transferred by the host device placing the additional data words on the bus and toggling the strobe signal to latch the data word into the peripheral drive device. Steps to perform a parallel bit oriented error detection during a write command synchronous DMA burst are similar to the steps performed during the read command synchronous DMA burst.

Preferably, the synchronous DMA burst is performed over an ATA bus having a control signal transmission strobe rate of approximately 8.3 MHz, and the data transfer rate is increased to approximately 33.3 MBytes/sec.

The method of the present invention provides many advantages over prior transfer protocols. In particular, the synchronous DMA burst transfer protocol provides a significantly increased data transfer rate between a host device and a peripheral drive device and is operable within existing bus system architectures. The present method is therefore an inexpensive way to increase the rate of data transfer between a host device and a peripheral drive device. Furthermore, the present method provides the increased data transfer rate and improved data integrity, without increasing the control signal transmission strobe rate on the bus, therefore eliminating problems of system integrity associated with increased control signal transmission frequencies. A further advantage of the present method is that backward compatibility with existing transfer protocols is provided so that the method is operable without substantial hardware modifications in systems including other peripheral drive devices which use the existing strobed transfer protocols.

BRIEF DESCRIPTION OF THE DRAWINGS

These and other features, aspects and advantages of the present invention will become better understood with regard to the following description, appended claims and accompanying drawings where:

FIG. 8b shows a more detailed diagram of the logic circuit shown in FIG. 8a.

DESCRIPTION

Figure 1A:
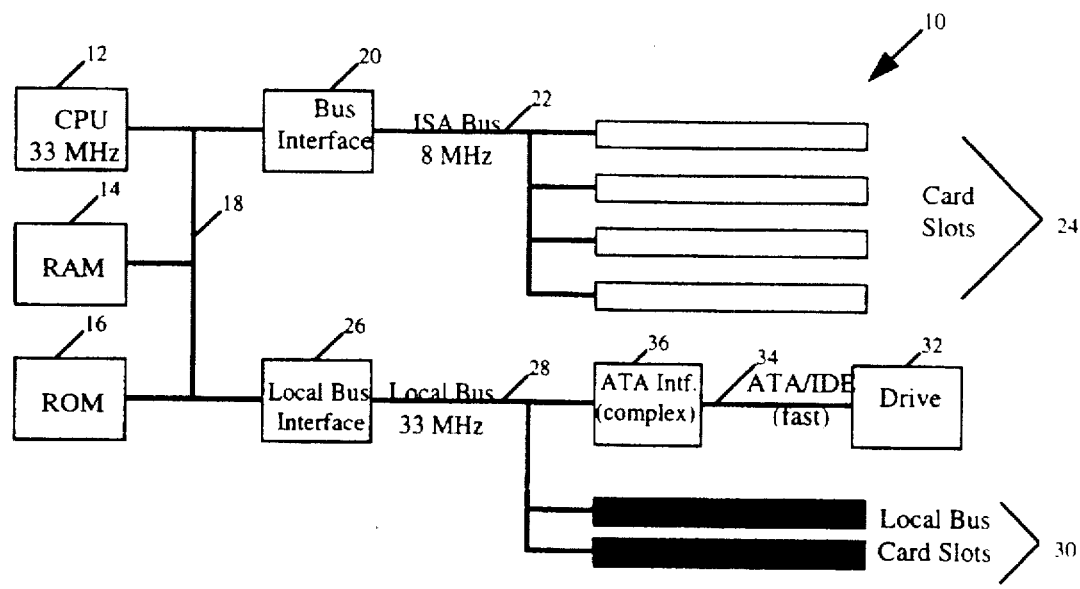
FIG. 1a shows a block diagram of a PC architecture in which the present invention can be implemented.

FIG. 1a shows an example of a conventional PC architecture in which a method embodying aspects of the present invention can be implemented. The PC system 10 typically includes a CPU 12 connected to a RAM 14 and a ROM 16 by a processor bus 18. A bus interface 20 connects the processor bus 18 to an ISA bus 22 which can include a plurality of card slots 24. Additionally, a local bus interface 26 connects the processor bus 18 to a local bus 28 which can also include a number of local bus card slots 30. A peripheral drive device 32 is connected to the local bus 28 via an ATA bus 34 and ATA interface 36.

Figure 1B:
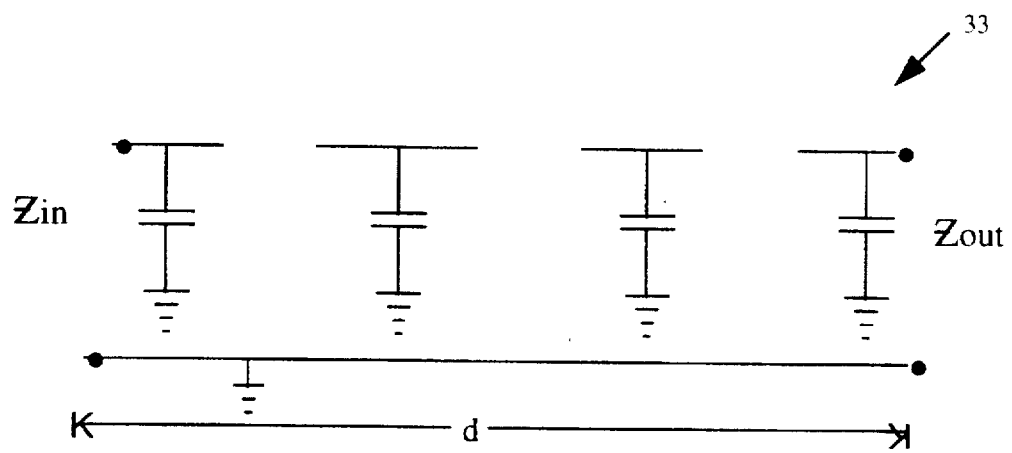
FIG. 1b shows a partial schematic circuit representation for existing ATA cables.

FIG. 1b shows a partial schematic electrical circuit diagram for one signal path of a conventional ATA bus 34 cable. The line 33 of the ATA bus 34 has a source or input impedance $Z_{in}$ and a resulting termination or output impedance $Z_{out}$ which is a function of the input impedance $Z_{in}$, the characteristic impedance $Z_{char}$ of the ATA bus line 33, and the distance d of the ATA bus line 33. As discussed above in the Background section, the ATA bus 34 was not designed to be terminated. Thus, in the ATA bus 34 definition these impedance values for each signal line are such that $Z_{in} < Z_{char}$ and $Z_{char} < Z_{out}$ resulting in the problem of ringing.

For simplicity, the following discussion describes a disk drive connected to a host by an ATA bus. However, as those skilled in the art will recognize, the present invention is capable of being implemented in a system having other peripheral devices on the ATA bus. Additionally, the term host device generally refers to the host end of the ATA bus, which one skilled in the art will recognize to include, for example, the CPU 12 and the ATA bridge/interface 36. The present invention can also be realized in a system having plural drive devices (not shown) connected to the ATA bus 34.

Figure 2:
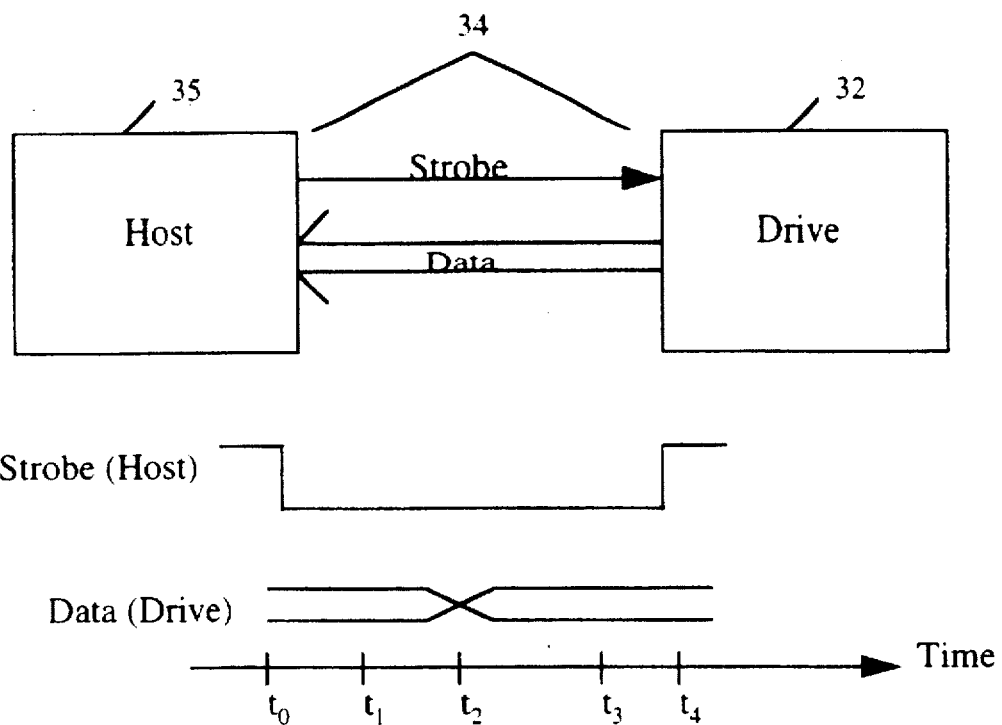
FIG. 2 shows a simplified component and timing diagram for a prior art data transfer protocol.

Referring to FIG. 2, the prior art DMA transfer protocol is a strobed, asynchronous transfer protocol where an ATA host 35 is always in charge of when events are to take place. FIG. 2 shows the strobe signal from the perspective of the host 35, and the data from the perspective of the disk drive 32. When the ATA host 35 wants to read data from an attached disk drive 32, it sends a strobe to the disk drive 32 at time $t_0$. The disk drive 32 does not know when it has to transfer data until it sees the falling edge of the strobe. Prior to receiving the strobe signal, the disk drive 32 is just waiting for the "last minute" notification that it needs to get data ready to send to the host 35. The strobe takes time to travel from the host 35 to the disk drive 32, so the disk drive 32 receives the request later than when the host 35 asks for the data. The disk drive 32 finally sees the strobe at some later time $t_1$. Then after some processing delay, the disk drive 32 puts the data out on the bus at time $t_2$, to be sent back to the host 35. Another transit delay is associated with the data being sent back to the host 35, so the data does not arrive at the host 35 until some later time $t_3$. Another processing delay is associated receiving the data, so the host finally latches the data at time $t_4$. The host must latch the data during the strobe interval, and since there is a certain maximum speed that can be achieved, the strobe interval must be long enough to make sure that the data is available to the host. Thus, in the prior art asynchronous transfer protocol, the strobe interval must take into account transit delays associated with both the host 35 to disk drive 32 transit time and the disk drive 32 to host 35 transit time, as well as processing delays associated with both the host 35 and the disk drive 32. The necessity to account for these delays limits the data transfer rate to those currently obtained with DMA Mode 2 and PIO Mode 4.

Figure 3:
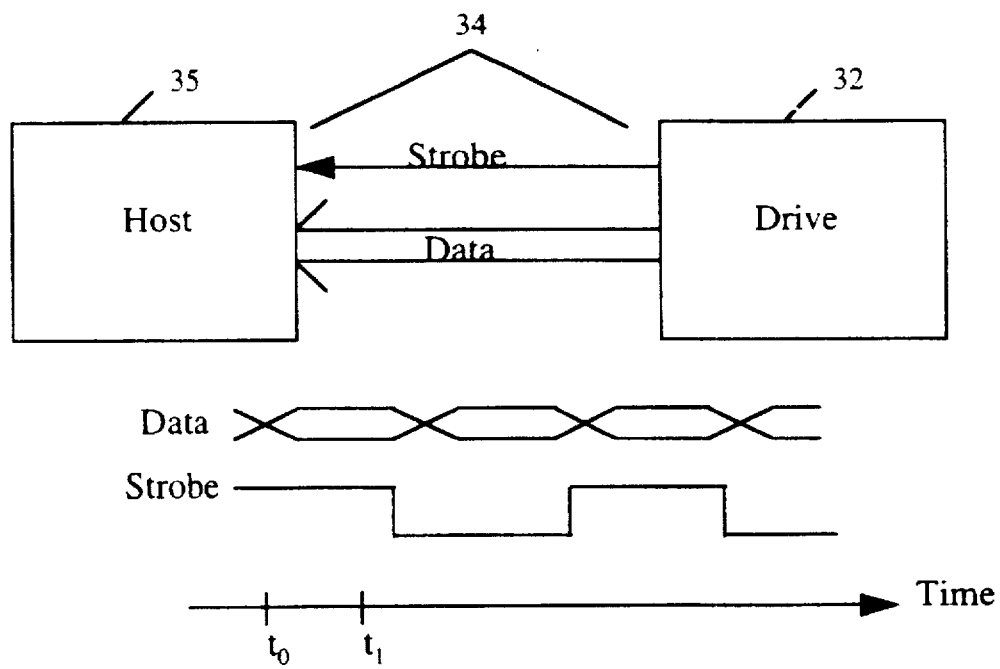
FIG. 3 shows a simplified component and timing diagram for a synchronous DMA burst according to a version of the present invention.

The present invention overcomes the data transfer limits imposed in the prior art transfer protocol by eliminating the situation where the disk drive 32 is waiting for the "last minute" notification that it needs to do a data transfer. Instead, in the present invention, the device which is sending data (whether host 35 or drive 32) is in charge of the controlling strobe signal. FIG. 3 shows a simplified timing diagram, from the perspective of the disk drive 32, of a version of the present invention where the disk drive 32 is in charge of the strobe signal to transfer data for a read DMA burst. Once the host 35 has given a command that it wants to read data and preliminary handshaking to initiate the burst is performed, the disk drive 32 is in charge and determines the time when the data is to be transferred. As shown in FIG. 3, when the disk drive 32 is ready to send the data, it places the data on the bus at time to, then the disk drive 32 will wait until it knows the data has settled on the cable and the disk drive 32 will toggle the strobe signal at time $t_1$. The toggling of the strobe signal indicates to the host 35 that the data is available, and the data is latched into the host 35 when the strobe generated at time $t_1$ reaches the host.

The delay between the time the disk drive 32 places the data on the bus and the time it toggles the strobe signal is necessary because when data is placed on the ATA bus, there is associated ringing due to the poor termination of the bus, so it is necessary to let the data signal settle before latching it in the host 35. However, the flight or propagation time to get from the disk drive 32 to the host 35 is substantially the same for both the data signal and the strobe signal, and the slew rate (time for a signal to change from "1" to "0" or "0" to "1") is substantially the same for both the data signal and the strobe signal. With the present invention, only the settling time of the data signal needs to be accounted for, since the data and the strobe are sent by one device and the slew rates and propagation delays of these signals are similar. If loading at the host end of the cable changes the slew rate of the data signal, the slew rate of the strobe signal will be changed by a similar amount, and the relative timing of the signals will still be similar. This provides a significant time improvement over the prior art transfer protocol where the host 35 is in charge of the strobe signal and the disk drive 32 is in charge of the data signal. In the prior art situation, time is lost sending the strobe to the disk drive 32, time is lost sending the data to the host 35, and the lost time can never be recovered.

According to aspects of the present invention, very short strobe intervals can be set up since the propagation delays and slew rates in both directions do not have to be accounted for. To ensure data transfer, the synchronous DMA transfer of the present invention only requires a latency for the data to settle before the strobe signal can reach the host 35. Thus, the synchronous DMA burst method of the present invention provides an increased data transfer rate of up to 33.3 MBytes/sec which is double the fastest currently existing PIO Modes and Multiword DMA Modes.

Figure 4A:
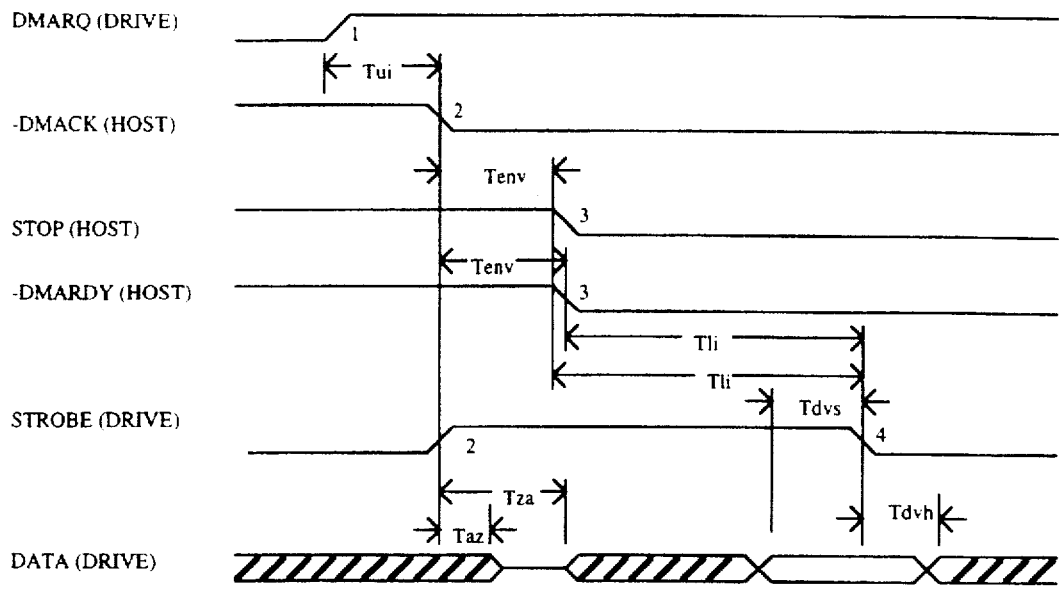
FIG. 4a shows a detailed timing diagram illustrating the data and control signals exchanged during drive initiation of a synchronous DMA burst for a read command implemented according to aspects of the present invention.

Details discussing the initiation of the synchronous DMA transfer according to an embodiment of the present invention will now be described with reference to FIGS. 4a and 4b. Referring to FIG. 4a, sometime after the host 35 has sent a read command requesting data and the disk drive 32 is ready to begin the data transfer, the disk drive 32 will initiate the synchronous DMA burst by asserting a DMA request signal, DMARQ (indicated as event 1), to the host 35. In response to DMARQ being asserted, when the host 35 is ready to receive the requested data, the host 35 indicates it is ready by asserting a DMA acknowledge signal, -DMACK (indicated as event 2), and must keep -DMACK asserted until the end of the burst. The disk drive 32 can drive or place data on the ATA bus 34 after a minimum time delay $T_{za}$, from assertion of -DMACK, allowing for output drivers to turn on. Typically, the minimum time $T_{za}$ required for the output drivers to turn on is approximately 20 ns. Before the disk drive 32 can toggle the strobe signal which latches the data into the host 35, the disk drive must also wait for the host 35 to deassert a stop signal, STOP, and assert a ready signal, -DMARDY, after the host asserts -DMACK. The deassertion of STOP and assertion of -DMARDY (indicated as events 3) are performed within a standard time envelope for all control signal transitions from the assertion of -DMACK. This time envelope is preferably within a range of approximately 20 to 70 ns.

After the host 35 has deasserted STOP and asserted -DMARDY, the disk drive 32 can send the first strobe signal and must do so within a limited time period $T_{li}$, after seeing the STOP and -DMARDY signals. Preferably, this limited time period $T_{li}$ is within a range of approximately 0 to 150 ns. Additionally, the disk drive 32 must wait a minimum predetermined setup time period $T_{dvs}$, measured from when the disk drive 32 placed the data word on the ATA bus 34, before it can send the first strobe signal. This time period being the time it takes the data to become valid on the ATA bus 34. Preferably, the minimum setup time $T_{dvs}$ is within a range of from about 38 to about 75 ns, depending on the speed selected.

The disk drive 32 sends the first strobe signal to the host 35 by toggling the strobe signal from a high state to a low state (indicated as event 4). The toggling of the strobe signal from the high state to the low state defines a first edge of the strobe signal which is recognized by the host 35 as an indication that valid data is available on the ATA bus 34. When the host 35 sees the edge, it takes the data off of the ATA bus 34. Thus, the toggling of the strobe signal is used to latch the data in the host 35 during a read burst.

Figure 4B:
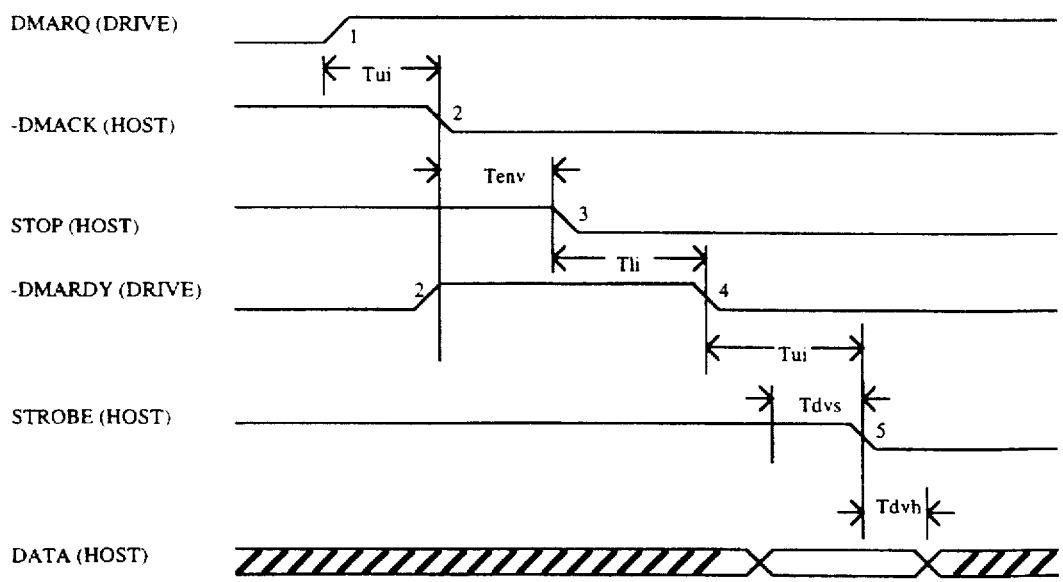
FIG. 4b shows a detailed timing diagram illustrating the data and control signals exchanged during drive initiation of a synchronous DMA burst for a write command implemented according to further aspects of the present invention.

Referring now to FIG. 4b, the initiation of the synchronous DMA burst for a write command will be described according to principles of the present invention. As in the case with a read command, the synchronous DMA burst is initiated by the disk drive 32 asserting DMARQ when it is ready to begin the synchronous DMA burst (event 1). In response to DMARQ being asserted, when the host 35 is ready to write its data, the host 35 indicates it is ready by asserting -DMACK (indicated as event 2) and deasserts STOP (indicated as event 3) within the standard time envelope of -DMACK. Additionally, the host 35 drives data on the ATA bus 34. The host 35 then waits for the disk drive 32 to assert -DMARDY which indicates that the disk drive 32 is ready to receive data from the host 35. The disk drive 32 must assert -DMARDY (indicated as event 4) within the limited time period $T_{li}$ after seeing -DMACK asserted and STOP deasserted. Since the host 35 is now sending data, the host 35 is now also in charge of the strobe signal, but before the host 35 can toggle the strobe signal, it must wait for -DMARDY to be asserted by the disk drive 32 as described above.

Once the disk drive 32 asserts -DMARDY, the host 35 may toggle the first strobe signal (indicated as event 5) anytime after seeing -DMARDY. However, the host 35 must wait the minimum predetermined setup time period $T_{dvs}$, measured from when the host 35 placed the data word on the ATA bus 34, before it can send the first strobe signal, to allow for the data to become valid. Similar to the read case, when the disk drive 32 sees the first edge of the strobe signal, it knows to take valid data off of the ATA bus 34. Thus, the toggling of the strobe signal is used to latch the data in the disk drive 32 during the write burst.

Figure 5:
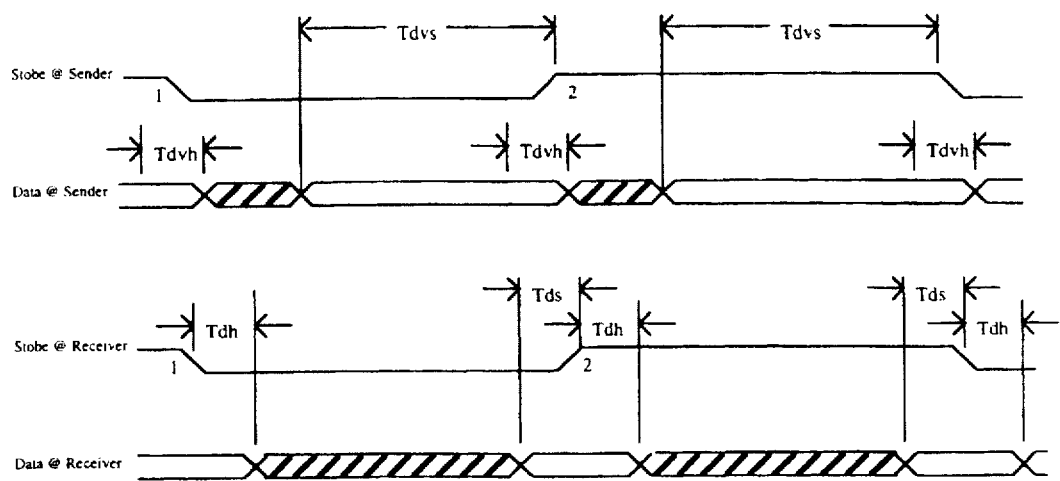
FIG. 5 shows a detailed timing diagram illustrating the data and control signals exchanged during a sustained synchronous DMA burst according to further aspects of the present invention.

After the synchronous DMA burst is initiated and the first data word is latched into the host 35, in the case of a read command, or into the disk drive 32, in the case of a write command, additional data words can be transferred during the synchronous DMA burst. FIG. 5 shows a timing diagram of the control and data signals during a sustained synchronous DMA burst transferring plural data words. The figure generically depicts the data bus as seen by a sender and a receiver, rather the host and disk drive, to be applicable to both the case of a read burst and a write burst. As described above, a first data word which was driven on the ATA bus 34 at some earlier time $t_1$ (not shown) is latched into the receiver by the toggling of the strobe from the high state to the low state (event 1). At a second later time $t_2$, a next data word is driven on the ATA bus 34. This next data word is latched into the receiver by toggling the strobe signal from the low state to the high state (event 2). The toggling of the strobe signal from the low state back to the high state defines a second edge of the strobe signal. Further additional words can be driven on the ATA bus 34 by the sender and latched into the receiver by toggling of the strobe signal back and forth between the high and low states. From the receiver's viewpoint, whenever an edge of the strobe signal is seen, the receiver knows to take data off of the ATA bus 34. Thus, both edges of the strobe signal are utilized in the synchronous DMA burst to transfer data.

As shown in FIG. 5 and described above, during the synchronous DMA burst, the sender always drives data onto the ATA bus 34 and after the minimum predetermined setup time period $T_{dvs}$, allowing for cable settling and setup time, the sender will toggle the strobe signal. Using both edges of the strobe signal in the manner described above enables the frequency of the strobe signal to match the frequency of the data. On the ATA bus the highest fundamental control signal frequency on the cable should be no greater than approximately 8.33 MHz, so that signal integrity is maintained.

Furthermore, the data is shown differently at the sender and the receiver to emphasize that cable settling time will not allow the data to be considered stable at the receiver until long after it is driven at the sender. The minimum predetermined setup time that data is required valid at the sender $T_{dvs}$, and the minimum time that the data may go invalid after the sender toggles the strobe signal Tdvh, form a wider window than the data setup time $T_{ds}$ and the data hold time Tdh guaranteed to the receiver.

Termination of a synchronous DMA burst will now be discussed with reference to FIGS. 6a, 6b, 7a and 7b. After the strobe signal has been toggled for the first time, both the sender and the receiver can take actions to terminate the burst. Certain conditions must first be met before the synchronous DMA burst is terminated. When the receiver wishes to terminate the burst, it must first ensure that the pending transfer is fully paused. Likewise, when the sender wishes to terminate the burst, it must wait a minimum time period $T_{ss}$ after toggling the strobe signal before it can assert a stop signal or deassert DMARQ to terminate the pending transfer. Preferably, the minimum time period $T_{ss}$ is approximately 50 ns.

Figure 6A:
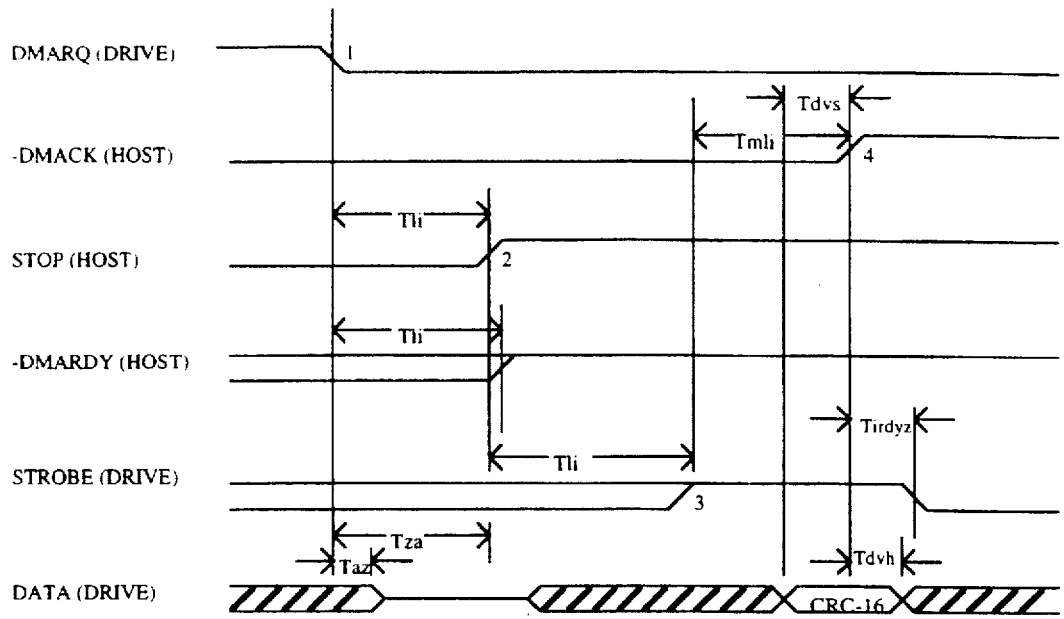
FIG. 6a shows a detailed timing diagram illustrating the data and control signals exchanged during drive termination of a synchronous DMA burst for a read command implemented according to further aspects of the present invention.

FIG. 6a shows the control and data signals exchanged when the disk drive 32 terminates the synchronous DMA burst during a read command. The disk drive 32 indicates its desire to terminate the burst by deasserting the DMARQ signal (event 1), and the host 35 acknowledges the deassertion by asserting STOP and deasserting -DMARDY within the limited time period $T_{li}$ (event 2). Once the disk drive 32 sees that the host 35 has asserted STOP, the disk drive 32 must return the strobe signal to the high state, if it isn't already in the high state (event 3). The returning of the strobe signal to the high state must be done within the limited time period $T_{li}$ after seeing the STOP signal. After the host 35 sees that DMARQ is deasserted, STOP is asserted, -DMARDY is deasserted, and the strobe signal is high, the host 35 can deassert -DMACK (event 4), and must do so within a minimum limited predetermined time period $T_{mli}$ after all the listed conditions are met. Preferably, the minimum limited predetermined time period $T_{mli}$ is a range of from about 20 to about 150 ns. Additionally, the disk drive 32 tri-states the strobe signal after a pull-up time $T_{irdyz}$, allowing for a control signal to go to high impedance, as measured from the deassertion of -DMACK by the host 35. Typically, the pull-up time Tirdyz, is approximately 20 ns.

Upon termination of the synchronous DMA burst, the strobe signal is required to be returned to the high state so that the strobe signal is ready for a next synchronous DMA burst. This "strobe clean-up" is necessary since the first strobe signal in any synchronous DMA burst must be toggled from the high state to the low state to latch the first data word into the receiver. The strobe clean-up is also advantageous because it allows the present synchronous DMA burst method to be backwardly compatible with existing host-peripheral data transfer protocols which also use the strobe signal in an initial high state.

Figure 6B:
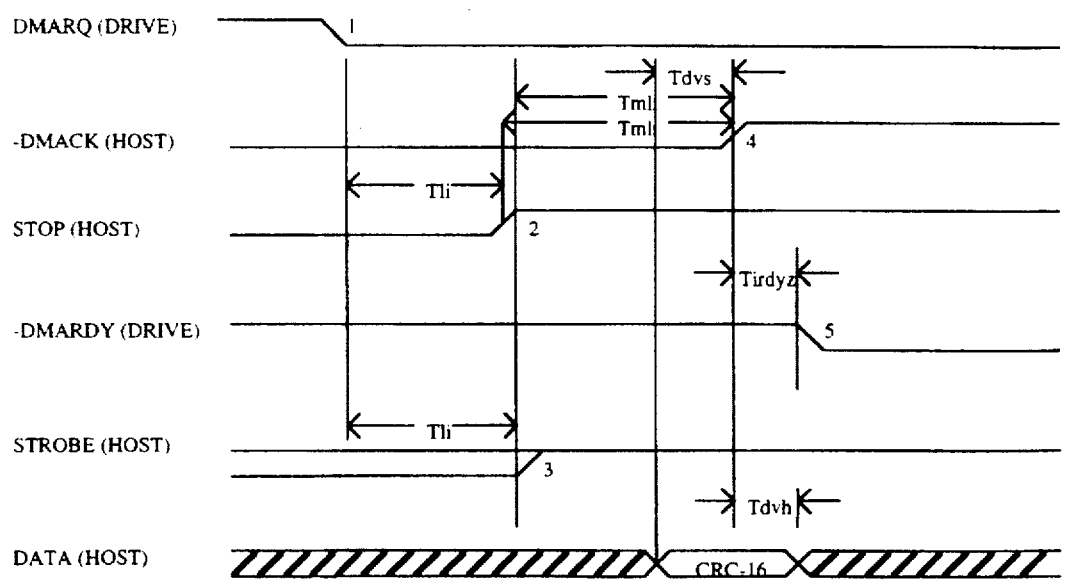
FIG. 6b shows a detailed timing diagram illustrating the data and control signals exchanged during drive termination of a synchronous DMA burst for a write command implemented according to further aspects of the present invention.

FIG. 6b shows the control and data signals exchanged when the disk drive 32 terminates the synchronous DMA burst during a write command. As in the case of the disk drive 32 terminating a read burst, the disk drive 32 indicates its desire to terminate the burst by deasserting the DMARQ signal (event 1). The host 35 acknowledges the deassertion of DMARQ by asserting STOP within the limited time period $T_{li}$ (event 2), and by returning the strobe signal to the high state within the limited time period $T_{li}$ (event 3). The host 35 can deassert -DMACK (event 4) once the above events have taken place, and within the minimum limited predetermined time limit $T_{mli}$. Finally, the disk drive 32 then tri-states -DMARDY (event 5) after the pull-up time $T_{irdyz}$, as measured from the deassertion of -DMACK by the host 35.

Figure 7A:
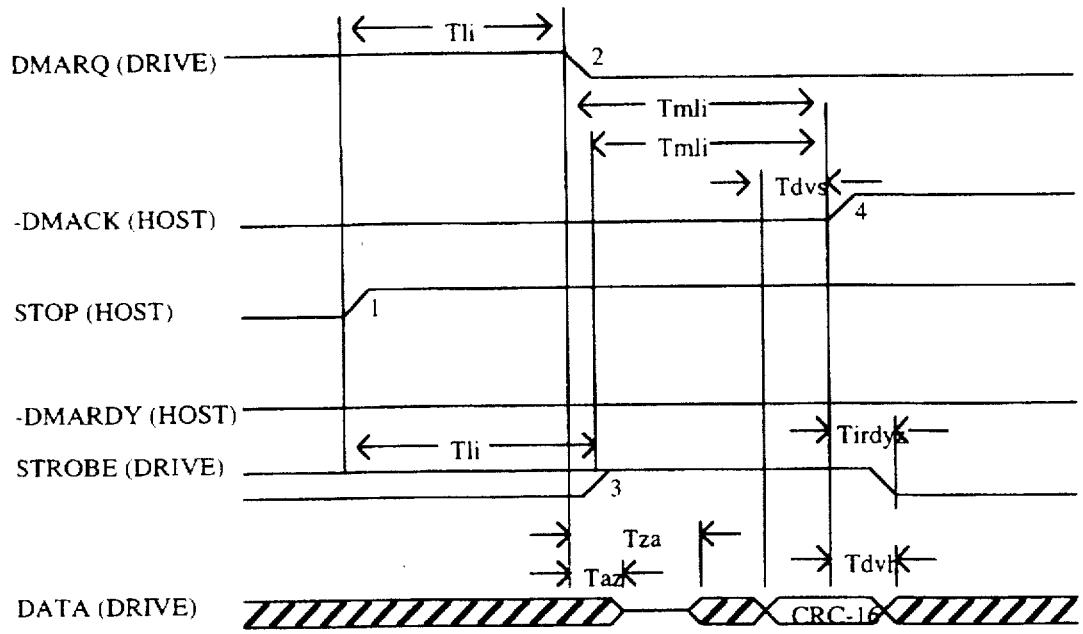
FIG. 7a shows a detailed timing diagram illustrating the data and control signals exchanged during host termination of a synchronous DMA burst for a read command implemented according to further aspects of the present invention.

FIG. 7a shows the control and data signals exchanged when the host 35 terminates the synchronous DMA burst during a read command. Here, the host 35 signals its desire to terminate the burst by asserting the STOP signal (event 1), and the disk drive 32 acknowledges the request by deasserting DMARQ (event 2) and returning the strobe signal to the high state (event 3) within the limited predetermined time period $T_{li}$ after seeing STOP. Then, as in the cases when the disk drive 32 terminated the synchronous DMA burst, the host 35 deasserts -DMACK (event 4) within the minimum limited predetermined time period $T_{mli}$ after the above events have occurred. Finally, the disk drive 32 tri-states the strobe signal after the pull-up time $T_{irdyz}$.

Figure 7B:
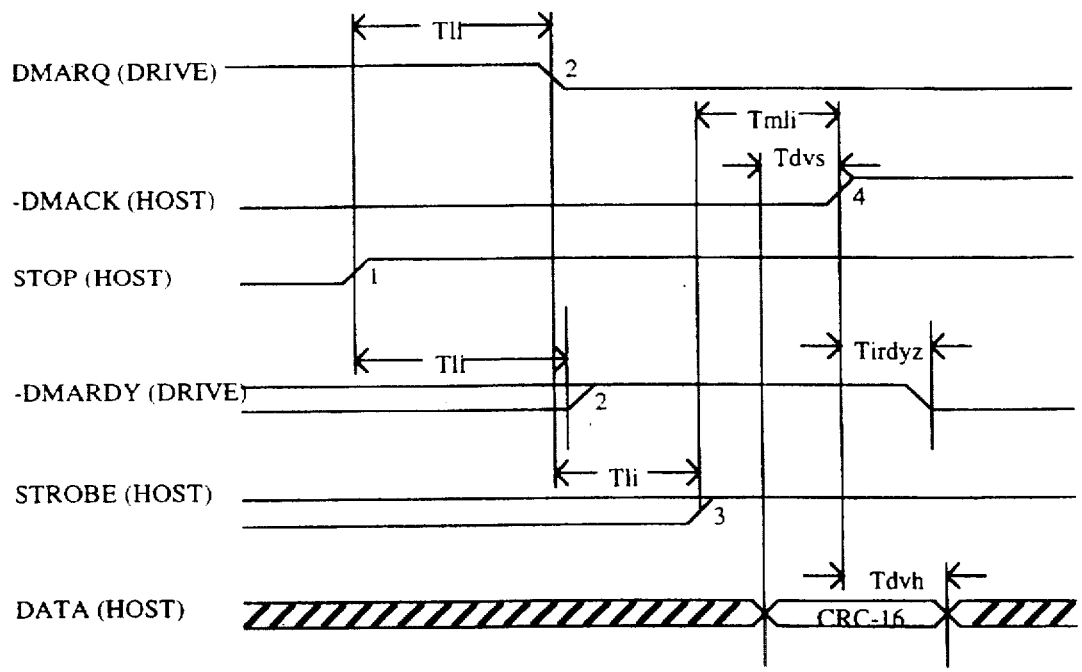
FIG. 7b shows a detailed timing diagram illustrating the data and control signals exchanged during host termination of a synchronous DMA burst for a write command implemented according to further aspects of the present invention.

FIG. 7b shows the control and data signals exchanged when the host 35 terminates the synchronous DMA burst during a write command. As in the case of the host 35 terminating a read burst, the host 35 signals its desire to terminate the burst by asserting the STOP signal (event 1). The disk drive 32 acknowledges the request by deasserting DMARQ and deasserting -DMARDY (events 2) within the limited predetermined time period $T_{li}$ after seeing STOP.

The host 35 must then return the strobe signal to the high state (event 3) within the limited predetermined time period $T_{li}$ after seeing DMARQ deasserted. Once the strobe signal has been returned to the high state, the host 35 must also deassert -DMACK (event 4) within the minimum limited predetermined time period $T_{mli}$ after returning the strobe signal to the high state. Then the disk drive 32 tri-states -DMARDY after the pull-up time $T_{irdyz}$.

The method of the present invention further includes steps for performing error detection for data integrity of the data being transferred over the ATA bus 34. In a preferred embodiment, a bit-error detection code is implemented since the synchronous DMA bursts are transferring data words over the ATA bus 34, and thus a bit oriented error detection approach is more practical than a symbol oriented error detection approach. However, as discussed above in the Background section, conventional bit oriented error detection is impractical since the conventional bit error detection is a bit serial approach.

Figure 8A:
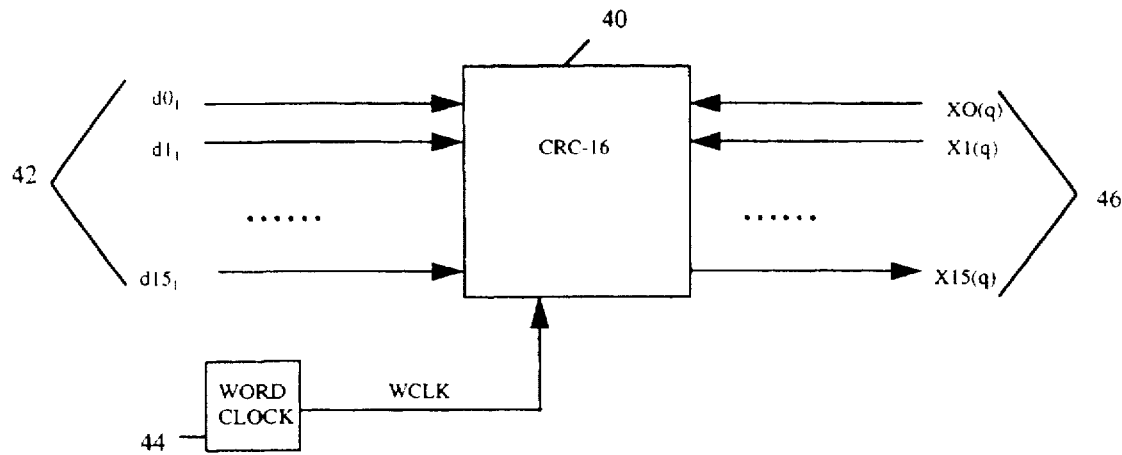
FIG. 8a shows a simplified logic circuit for implementing error detection according to an embodiment of the present invention.
Figure 8B:
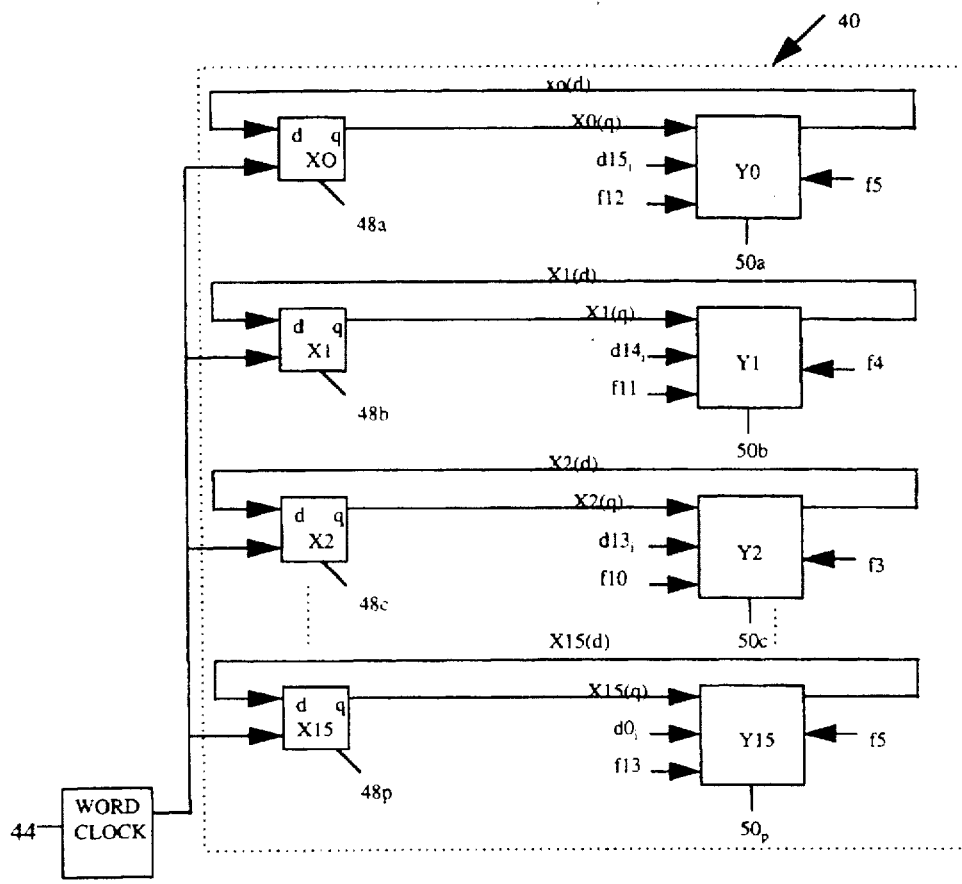

A novel 16-bit parallel CRC approach is implemented using a parallel CRC logic encoder/decoder 40, shown in FIGS. 8a and 8b. The parallel CRC logic encoder/decoder 40 uses the same generator polynomial as the conventional bit-serial approach, but a word clock 44 is used instead of the bit clock. A 16-bit CRC value is cyclically calculated by both the host 35 and the disk drive 32 as each data word is being transferred over the ATA bus 34. At the end of the data transfer, the host device 35 sends its generated 16-bit CRC value over the ATA bus 34 to the disk drive 32, and the disk drive 32 exclusive-or's the received 16-bit CRC value with its calculated 16-bit CRC value, to check for an error. If an error is detected, the disk drive 32 sets an error bit of an error register to report the error to the host 35 at the end of the command.

In a preferred version of the invention, the CRC value is calculated in the following manner. FIG. 8a shows a simplified logic circuit for the CRC logic encoder/decoder 40 performing error detection for a version of the present invention. Both the host 35 and the disk drive 32 include the circuitry for the CRC logic encoder/decoder 40. At the beginning of each synchronous DMA burst transfer, the CRC logic encoder/decoder 40 is set to a predetermined value. Preferably the value is $516d_h$. A stream of 16-bit data words enters the CRC logic encoder/decoder 40, the CRC logic encoder/decoder 40 performs logic operations on the input data bits, and the CRC value is output from the CRC logic encoder/decoder 40. If "d" represents the stream of data words entering the CRC logic encoder/decoder 40, the entire stream of data bits is represented as follows:

| | |
|---|---|
| $d15_0, d14_0, d13_0, \ldots, d1_0, d0_0$ | : first word |
| $d15_1, d14_1, d13_1, \ldots, d1_1, d0_1$ | : second word |
| $\ldots$ | |
| $d15_i, d14_i, d13_i, \ldots, d1_i, d0_i$ | : ith word, | where d15 is the most significant bit of a data word, and d0 is the least significant bit of a data word. The 16 data bits $d0_i$–$d15_i$ 42 of each ith word being transferred is shifted into the CRC logic encoder/decoder 40 using a clock signal WCLK from a word clock 44, the CRC calculation is performed, and a calculated 16-bit CRC value is output as X0(q)–X15(q) 46.

Referring to FIG. 8b, a more detailed schematic of the CRC logic encoder/decoder 40 is shown. The CRC logic encoder/decoder 40 includes 16 1-bit registers X0–X15 48a–48p, which serve as place holders for the 16-bit CRC value being calculated, and 16 corresponding combinational logic components Y0–Y15 50a–50p performing logic operations on the data bits. As shown in FIG. 8b, the combinational logic components Y0–Y15 50a–50p include an input from its corresponding register X0–X15 48a–48p. The combinational logic components Y0–Y15 50a–50p include additional inputs from the various components of the CRC logic encoder/decoder 40. However, for clarity and simplicity, these operative connections with the other components are not shown. The output of the combinational logic components 50a–50p is then fed back to the registers X0–X15 48a–48p as input. Representing inputs to the registers of the CRC logic encoder/decoder as (d) and outputs from the registers as (q), the CRC value is cyclically calculated using the following equations:

| | |
|---|---|
| X0(d) = f16; | X8(d) = f8 xor f13; |
| X1(d) = f15; | X9(d) = f7 xor f12; |
| X2(d) = f14; | X10(d) = f6 xor f11; |
| X3(d) = f13; | X11(d) = f5 xor f10; |
| X4(d) = f12; | X12(d) = f4 xor f9 xor f16; |
| X5(d) = f11 xor f16; | X13(d) = f3 xor f8 xor f15; |
| X6(d) = f10 xor f15; | X14(d) = f2 xor f7 xor f14; |
| X7(d) = f9 xor f14; | X15(d) = f1 xor f6 xor f13; | where

| | |
|---|---|
| f1 = d0$_i$ xor X15(q); | f9 = d8$_i$ xor X7(q) xor f5; |
| f2 = d1$_i$ xor X14(q); | f10 = d9$_i$ xor X6(q) xor f6; |
| f3 = d2$_i$ xor X13(q); | f11 = d10$_i$ xor X5(q) xor f7; |
| f4 = d3$_i$ xor X12(q); | f12 = d11$_i$ xor X4(q) xor f1 xor f8; |
| f5 = d4$_i$ xor X11(q) xor f1; | f13 = d12$_i$ xor X3(q) xor f2 xor f9; |
| f6 = d5$_i$ xor X10(q) xor f2; | f14 = d13$_i$ xor X2(q) xor f3 xor f10; |
| f7 = d6$_i$ xor X9(q) xor f3; | f15 = d14$_i$ xor X1(q) xor f4 xor f11; |
| f8 = d7$_i$ xor X8(q) xor f4; | f16 = d15$_i$ xor X0(q) xor f5 xor f12. |

During a synchronous DMA burst for a write command, as the host 35 sends each data word, it also calculates its 16-bit CRC value in the manner described above. Similarly, as the disk drive 32 receives each data word, it calculates its 16-bit CRC value. When the host 35 is finished transferring data words at the end of the synchronous DMA burst, the host 35 sends its calculated CRC value over the ATA bus 34. Upon receipt of the host's CRC value, the disk drive 32 exclusive-or's the received CRC value with its own calculated CRC value, and checks to see if the result is zero. If a zero result is obtained, no error is reported. A non-zero result however, indicates an error, which is reported to the host by setting of an error bit in an error register at the disk drive 32.

A similar procedure is carried out during a synchronous burst for a read command. As the disk drive 32 sends each data word over the ATA bus 34 to the host 35, the disk drive 32 calculates its CRC value. Similarly, as the host 35 receives each data word, it calculates its CRC value. However, at the end of the synchronous DMA burst when the disk drive 32 is finished transferring data words, it does not send its calculated CRC value to the host 35. Instead, as in the case of the write command, the host 35 sends its calculated CRC value over the ATA bus 34 to the disk drive 32, which then performs the exclusive-or and zero check described above.

Preferably, the parallel CRC check performed during the synchronous DMA burst is transparent to software drivers for peripheral drive devices of existing ATA systems. When a synchronous DMA burst bit error is detected using the parallel CRC approach, bits 2 and 7 of the current ATA Error Register are set. Bit 7 is currently a reserved bit of the ATA Error Register and is redefined as an Interface Error bit under the present synchronous DMA burst protocol. Bit 2 is an Aborted Command bit and is set so that the current ATA software drivers will detect and respond to this "new" error. Thus, the parallel CRC check performed during the synchronous DMA burst protocol of the present invention is backwardly compatible with existing software drivers.

Those skilled in the art would recognize that other error detection approaches can be implemented using a 16-bit register in a similar fashion. For example, if it were desired to detect symbol oriented burst errors, a 16-bit symbol Reed-Solomon ECC can be calculated in a known manner. Another approach for checking data integrity, can be to implement a parity check at the termination of each synchronous DMA burst.

Figure 9:
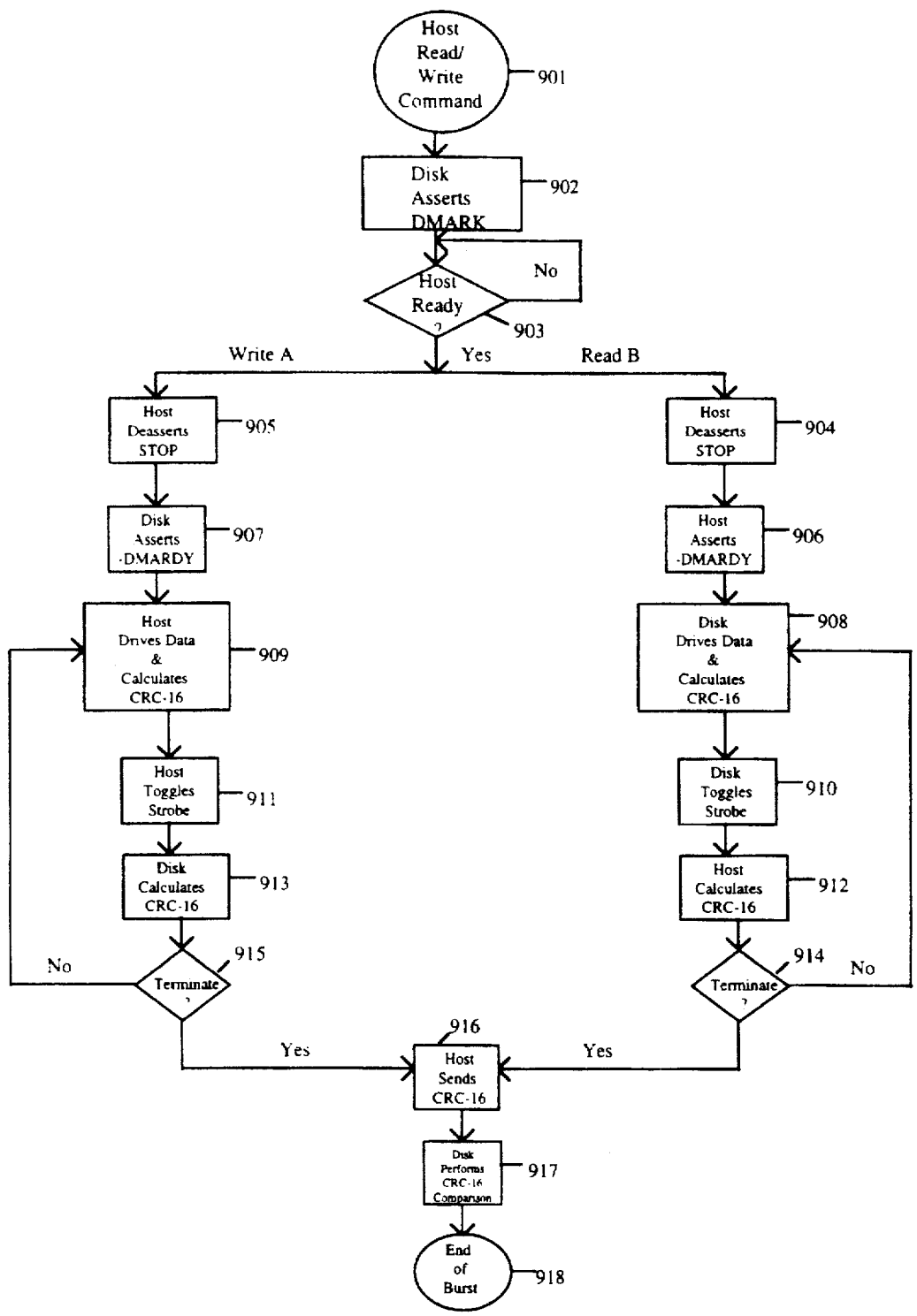
FIG. 9 shows a simplified flow chart illustrating a version of the present invention.

Operation of an embodiment of the synchronous DMA burst transfer method of the present invention will now be discussed with reference to FIG. 9 which shows a simplified flowchart for performing a synchronous DMA burst transfer. Each of the steps shown in the flowchart of FIG. 9 is carried out according to the timing restrictions detailed above with reference to the individual steps of the method. A synchronous DMA burst is initiated in response to receipt and decoding of a host read or write command 901 by the disk drive. The disk drive always initiates the synchronous DMA burst by asserting DMARQ 902 when it is ready to start the burst. The host must be ready to proceed with the synchronous DMA burst before the burst can be carried out, so a determination whether the host is ready 903 is made. If the host is not ready, the burst is not started and the disk must continue to check if the host is ready. If the host is ready, as indicated by assertion of -DMACK, the method proceeds along path A or B depending on whether a host write or read command was decoded. For a write command, the host deasserts STOP 905 to indicate that the transfer can proceed. In response to the host's deassertion of STOP, the disk drive asserts -DMARDY 907 to indicate to the host that it is ready to accept data. After the host sees -DMARDY, the host drives a data word on the bus, and calculates a 16-bit CRC value 909. The host then toggles the strobe signal 911 after driving the data word on the bus and seeing that the disk drive is ready. After the data is latched by the toggling of the strobe signal, the disk drive calculates its 16-bit CRC value 913. Then, it is determined whether the burst is to be terminated 915. If there is still more data to be transferred, the method loops back to the steps of the host driving data and calculating the CRC value 909, the host toggling the strobe signal 911, the disk drive calculating its CRC value 913, then determining whether the burst is to be terminated 915. This loop is repeated until it is determined that the burst is to be terminated. Termination is performed in the manner described above with reference to FIGS. 6a, 6b, 7a and 7b. Once termination is detected, the host sends its calculated CRC value 916 to the disk drive and the disk drive compares the received CRC value with its calculated CRC value 917, in the manner detailed above. The completion of the CRC comparison indicates the end of the synchronous DMA burst 918.

Referring back to when it is determined that the host is ready 903 to proceed with the synchronous DMA burst, path B is followed if the host command was a read command. The host deasserts STOP 904 to indicate that the transfer is to proceed, and also asserts -DMARDY 906 to indicate that it is ready to accept data. After the disk drive sees STOP and -DMARDY from the host, the disk drive drives the data word on the bus, and calculates a 16-bit CRC value. Then the disk drive toggles the strobe signal 910. After latching the data word in the host by the toggling of the strobe signal, the host calculates its 16-bit CRC value. After the calculation of the 16-bit CRC value by the host, the method proceeds in a manner similar to that for the case of a write command, where it is determined whether the burst is to be terminated 914, the disk drive continues to drive data, calculates the CRC value 908, and toggle the strobe signal 910, and the host calculates its CRC value until a termination is detected. Once termination is detected, the same steps that were described with reference to a write command termination are performed. That is, the host sends its calculated CRC value 916 to the disk drive and the disk drive performs a CRC comparison 917, and the completion of the CRC comparison indicates the end of the synchronous DMA burst 918.

The versions of the present invention have been described with reference to performing a single synchronous DMA burst for transferring one or more data words. However, since a host read or write command can require the performance of a series of synchronous DMA bursts, those skilled in the art will recognize that the above described versions of performing the synchronous DMA burst are repeated until the host read or write command is completed. The disk drive 32 must initiate the second/additional synchronous DMA burst, the host 35 must indicate that it is ready to start the burst, and so on, as described above.

The versions of the present invention described above are easily implemented in existing systems with an ATA interface without the need for additional signal lines or electrical changes to the ATA bus. The synchronous DMA burst transfer can be carried out in existing systems by using the current signal lines and redefining some of the current ATA signal lines to provide new functions. In particular, the IORDY signal used for PIO flow control and the -DIOR used for read commands in the prior art transfer protocols have been redefined. For write bursts, -DIOR is used as the STROBE signal and IORDY is used as the -DMARDY signal in the synchronous DMA protocol. For read bursts, -DIOR is used as -DMARDY signal and IORDY is used as the STROBE signal in the synchronous DMA protocol. Lastly, the -DIOW signal of the prior art transfer protocols has been redefined as the STOP signal in the present method. Additionally, the DMARQ and -DMACK signals remain unchanged to ensure backward compatibility with the existing transfer protocols.

Furthermore, very few hardware components are needed for proper termination of existing ATA bus configurations to enable implementation of the synchronous DMA burst transfer protocol of the present invention. Typically, the disk drive end of the ATA bus should be terminated with a series resistor in the range of about 47 to about 100 ohms. Preferably a series resistor of about 82 ohms should be used. Additionally, capacitors of less than about 10 pF can be added to ground on these lines. For any bidirectional lines and data driven lines, a series resistor in the range of about 22 to about 47 ohms is typically included. Similarly, on the host end of the ATA cable, a series resistor in the range of about 47 to about 100 ohms is included, and lines driven by the host are typically terminated with a series resistor in the range of about 22 to about 47 ohms. For both the disk drive end and the host end of the cable, the resistors are preferably placed as close to the ATA connector as possible. Additionally, the terminations are preferably chosen such that the capacitance received through the termination circuits is less than about 25 pF, and such that the rise and fall times of the signal lines are about 5 or more ns. These values are consistent with those currently recommended for ATA systems today.

Additionally, hardware required for the described 16-bit parallel CRC error detection logic can also be easily implemented using conventional circuitry. Preferably, the 16 1-bit registers used for holding the CRC value as it is being calculated can be implemented with 16 conventional flip-flops operatively connected in parallel. Further, the combinational logic components or blocks of the CRC logic encoder/decoder 40 can be constructed using conventional logic gates which implement the exclusive-or'ing operations as described above.

The synchronous DMA burst transfer method of the present invention provides several advantages over the prior art transfer methods. The present method provides an inexpensive way to get around the inadequate cabling structure and unreasonable termination inherent to the ATA bus 34 to obtain an increased data transfer rate of approximately 33.3 MBytes/sec. The present method can be implemented in existing ATA bus 34 configurations with a small number of additional gates. Additionally, the synchronous DMA burst transfer method is implemented using existing signal lines of the ATA bus 34 and redefining existing signal lines such that the present method is backwardly compatible with existing transfer protocols. A further advantage of the present method is that the synchronous DMA burst protocol provides an increased data transfer rate without increasing the control signal transmission strobe rate of the ATA bus 34, so that signal integrity is maintained. A still further advantage of the present invention is that it includes a procedure for parallel bit error detection which is transparent to existing software drivers of the ATA system, so that the present invention is backwardly compatible with the existing software drivers, but with greater data integrity.

Having thus described the invention in considerable detail with reference to certain preferred embodiments thereof, it will be appreciated that other embodiments are possible. It will be understood by those skilled in the art that many changes in construction and circuitry and applications of the invention will suggest themselves without departing from the spirit and scope of the invention. Therefore, the spirit and scope of the appended claims should not be limited to the description of the preferred embodiments contained therein.

What is claimed is:

1. In a computer system including a host device connected to at least one peripheral drive device by a bus, the bus for transferring data between the peripheral drive device and the host device in response to host device read and write commands through a series of synchronous DMA bursts, the bus having a control signal transmission strobe rate associated therewith, a method for performing a synchronous DMA burst for a read command comprising the steps of:

(a) the peripheral drive device asserting a DMA request signal to initiate the synchronous DMA burst;

(b) the host device asserting a DMA acknowledge signal in response to the DMA request signal when the host device is ready to begin the synchronous DMA burst;

(c) the peripheral drive device placing a first data word on the bus a first predetermined time period after the DMA acknowledge signal is asserted by the host device;

(d) the peripheral drive device toggling a strobe signal from a high state to a low state a second predetermined time period after placing the first data word on the bus, to latch the first data word into the host device, the toggling of the strobe signal from the high state to the low state defining a first edge of the strobe signal (e) the peripheral drive device placing an additional data word on the bus; and (f) the peripheral drive device toggling the strobe signal from the low state the high state after the second predetermined time period has elapsed to latch the additional data word into the host device, the toggling of the strobe signal from the low state to the high state defining a second edge of the strobe signal, such that the peripheral drive device controls initiating the synchronous DMA burst, such that control of both the data and the strobe signal by the peripheral drive device minimizes effects of propagation delay, cable settling and setup time associated with DMA bursts, and increases a data transfer rate of the bus, and such that the data is latched using both the first and second edge of the strobe signal thereby enabling the control signal transmission strobe rate of the bus to remain unchanged while increasing the data transfer rate.

2. The method of claim 1 further comprising the step of:

(g) the peripheral drive device asserting a stop signal to terminate the synchronous DMA burst; and (h) the peripheral drive device returning the strobe signal to the high state when the peripheral drive device is finished transferring data.

3. The method of claim 2 wherein the method is backwardly compatible with existing strobed transfer protocols.

4. The method of claim 1 wherein the synchronous DMA burst is performed over an ATA bus having a control signal transmission strobe rate of approximately 8.3 MHz, and the data transfer rate of the bus is increased to approximately 33.3 MBytes/sec.

5. The method of claim 1 further including parallel bit error detection comprising the steps of:

the peripheral drive device calculating a 16-bit CRC value for each data word placed on the bus;

after each data word is latched into the host device:
  the host device calculating a 16-bit CRC value for each data word received from the bus;

after the peripheral drive device is finished transferring data:
  (g) the host device sending its calculated 16-bit CRC value to the peripheral drive device; and
  (h) the peripheral drive device performing a comparison of the received 16-bit CRC value with its calculated 16-bit CRC value, such that validity of the data being transferred over the bus is verified.

6. The method of claim 5 wherein the parallel bit error detection is transparent to existing ATA software drivers to provide backward compatibility with existing ATA software drivers while improving data integrity.

7. The method of claim 5 wherein the steps of calculating the 16-bit CRC value by the peripheral drive device and by the host device are performed at a data word clock rate.

8. In a computer system including a host device connected to at least one peripheral drive device by a bus, the bus for transferring data between the host device and the peripheral drive device in response to host device read and write commands through a series of synchronous DMA bursts, the bus having a control signal transmission strobe rate associated therewith, the host device and the peripheral drive device respectively designated as a sender or receiver depending on type of command, a method for performing a synchronous DMA burst comprising the steps of:

(a) the peripheral drive device asserting a DMA request signal to initiate the synchronous DMA burst;

(b) the host device asserting a DMA acknowledge signal in response to the DMA request signal to indicate that the host device is ready to begin the synchronous DMA burst;

(c) the sender driving a first data word on the bus;

(d) the sender calculating a 16-bit CRC value for the first data word driven on the bus;

(e) the receiver asserting a ready signal responsive to the DMA acknowledge signal to indicate that the receiver is ready to receive data;

(f) the sender toggling a strobe signal from a high state to a low state within a first predetermined time period after the ready signal is asserted by the receiver and after a second predetermined time period has elapsed since the first data word was driven on the bus, the toggling of the strobe signal to latch the first data word into the receiver, the toggling of the strobe signal from the high state to the low state defining a first edge of the strobe signal and the toggling of the strobe signal from the low state to the high state defining a second edge of the strobe signal; and (g) the receiver calculating a 16-bit CRC value for the first data word received from the bus, such that bit errors can be detected with the calculated 16-bit CRC values to provide data integrity, and such that the peripheral drive device controls of initiation of the synchronous DMA burst, and such that both the first and the second edges of the strobe signal can be used to latch data words into the receiver, and such that control of both the data and the strobe signal by the sender minimizes effects of propagation delay, cable settling and setup time associated with DMA bursts thereby enabling an increased data transfer rate over the bus.

9. The method of claim 8 further comprising the steps of:

(h) the sender driving a second data word on the bus, and calculating the 16-bit CRC value for the second data word;

(i) the sender toggling the strobe signal from the low state to the high state after the second predetermined time period has elapsed since the second data word was driven on the bus to latch the second data word into the receiver;

(j) the receiver calculating the 16-bit CRC value for the second data word received from the bus;

(k) the sender repeating steps of driving a data word on the bus, calculating the 16-bit CRC value for the data word and toggling the strobe signal after the second predetermined time period has elapsed since the data word was driven on the bus, until the sender has finished sending data;

(l) the receiver calculating the 16-bit CRC value for each data word received from the bus;

(m) the sender asserting a stop DMA signal to indicate the sender has finished sending data and to terminate the synchronous DMA burst;

(n) the sender returning the strobe signal to the high state after the sender has finished sending data;

(o) the host device sending its calculated 16-bit CRC value to the peripheral drive device after the strobe signal is returned to the high state; and (p) the peripheral drive device comparing the received 16-bit CRC value with its calculated 16-bit CRC value, such that validity of the data being transferred over the bus is verified, and such that the method is backwardly compatible with existing strobed transfer protocols.

10. The method of claim 8 wherein the data is transferred over an ATA bus having a control signal transmission strobe rate of approximately 8.3 MHz, and wherein the use of both the first and the second edges of the strobe signal to latch the data into the receiver increases the data transfer rate without requiring the control signal transmission strobe rate of the ATA bus to be increased, thereby minimizing signal distortion on the ATA bus.

11. The method of claim 8 wherein the data transfer rate is approximately 33.3 MBytes/sec.

12. The method of claim 8 further including parallel bit error detection comprising the steps of:

after the sender is finished transferring data:

(h) the host device sending its calculated 16-bit CRC value to the peripheral drive device; and (g) the peripheral drive device performing a comparison of the received 16-bit CRC value with its calculated 16-bit CRC value, such that validity of the data being transferred over the bus is verified.

13. The method of claim 12 wherein the parallel bit error detection is transparent to existing ATA software drivers to provide backward compatibility with existing ATA software drivers while improving data integrity.

14. The method of claim 8 wherein the steps of calculating the 16-bit CRC value by the peripheral drive device and by the host device are performed at a data word clock rate.

15. In a computer system including a host device connected to at least one peripheral drive device by a bus, the bus for transferring data between the host device and the peripheral drive device in response to host device read and write commands through a series of synchronous DMA bursts, the bus having a control signal transmission strobe rate associated therewith, a method for performing a synchronous DMA burst for a write command comprising the steps of:

(a) the peripheral drive device asserting a DMA request signal to initiate the synchronous DMA burst;

(b) the host device asserting a DMA acknowledge signal in response to the DMA request signal and placing a first data word on the bus when the host device is ready to begin the synchronous DMA burst;

(c) the peripheral drive device asserting a ready signal within a predetermined time period after the DMA acknowledge signal is asserted by the host device; and (d) the host device toggling a strobe signal from a high state to a low state within the predetermined time period after the ready signal is asserted by the peripheral drive device, to latch the first data word into the peripheral drive device, the toggling of the strobe signal from the high state to the low state defining a first edge of the strobe signal, and the toggling of the strobe signal from the low state to the high state defining a second edge of the strobe signal, such that the peripheral drive device is always in control of initiating the synchronous DMA burst, such that control of both the data and the strobe signal by the host device minimizes effects of propagation delay, cable settling and setup time associated with DMA bursts, and such that both the first and second edges of the strobe signal are used to latch data words into the peripheral drive device thereby increasing a data transfer rate over the bus without increasing the control signal transmission strobe rate of the bus.

16. The method of claim 15 further comprising the steps of:

(e) the host device placing an additional data word on the bus; and (f) the host device toggling the strobe signal from the low state to the high state a second predetermined time period after placing the additional data word on the bus, to latch the additional data word into the peripheral drive device, such that additional data words are transferred over the bus and latched into the peripheral drive device using both the first and second edges of the strobe signal.

17. The method of claim 15 further comprising the step of:

(e) the host device returning the strobe signal to the high state when the host device is finished transferring data.

18. The method of claim 17 wherein the method is backwardly compatible with existing strobed transfer protocols.

19. The method of claim 15 wherein the synchronous DMA burst is performed over an ATA bus having a control signal transmission strobe rate of approximately 8.3 MHz and the data transfer rate is increased to approximately 33.3 MBytes/sec.

20. The method of claim 15 further including parallel bit error detection comprising the steps of:

(b)(1) the host device calculating a 16-bit CRC value for the data word placed on the bus;

after the data word is latched into the peripheral drive device:

(e) the peripheral drive device calculating a 16-bit CRC value for the data word received from the bus; after the host device is finished transferring data:

(f) the host device sending its calculated 16-bit CRC value to the peripheral drive device; and (g) the peripheral drive device performing a comparison of the received 16-bit CRC value with its calculated 16-bit CRC value, such that validity of the data being transferred over the bus is verified.

21. The method of claim 20 wherein the bit error detection is transparent to existing ATA software drivers to provide backward compatibility with existing ATA software drivers while improving data integrity.

22. The method of claim 20 wherein the steps of calculating the 16-bit CRC value by the peripheral drive device and by the host device are performed at a data word clock rate.

* * * * *